US012683448B2

(12) United States Patent
Hahn

(10) Patent No.: US 12,683,448 B2
(45) Date of Patent: Jul. 14, 2026

(54) MOTOR INNER IRON ASSEMBLY FOR A RECIPROCATING COMPRESSOR

(71) Applicant: Haier US Appliance Solutions, Inc., Wilmington, DE (US)

(72) Inventor: Gregory William Hahn, Mt. Washington, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 113 days.

(21) Appl. No.: 18/629,515

(22) Filed: Apr. 8, 2024

(65) Prior Publication Data

US 2025/0317018 A1      Oct. 9, 2025

(51) Int. Cl.
H02K 1/34 (2006.01)
H02K 15/03 (2006.01)

(52) U.S. Cl.
CPC ............... H02K 1/34 (2013.01); H02K 15/03 (2013.01)

(58) Field of Classification Search
CPC .................................. H02K 1/34; H02K 15/03
See application file for complete search history.

(56) References Cited

U.S. PATENT DOCUMENTS

| | | | | |
|---|---|---|---|---|
| 4,002,935 A | * | 1/1977 | Brauer ................... | H02K 33/18 |
| | | | | 417/418 |
| 6,413,057 B1 | | 7/2002 | Hong et al. | |
| 8,277,204 B2 | | 10/2012 | Choi et al. | |
| 9,488,165 B2 | | 11/2016 | Cho et al. | |
| 9,562,525 B2 | | 2/2017 | Hahn et al. | |
| 2006/0024181 A1 | | 2/2006 | Kim | |
| 2006/0093495 A1 | | 5/2006 | Oh et al. | |
| 2015/0226197 A1 | * | 8/2015 | Hahn .................... | F04B 39/122 |
| | | | | 417/363 |
| 2015/0226199 A1 | * | 8/2015 | Barito ..................... | F04B 35/04 |
| | | | | 417/363 |
| 2019/0093645 A1 | * | 3/2019 | Lee ........................ | F04B 35/045 |
| 2022/0154714 A1 | | 5/2022 | Latham et al. | |

FOREIGN PATENT DOCUMENTS

JP          2006050775 A      2/2006

* cited by examiner

*Primary Examiner* — Sean Gugger
(74) *Attorney, Agent, or Firm* — Dority & Manning, P.A.

(57) ABSTRACT

A motor assembly for a linear compressor defines an axial direction and a radial direction and includes an inner iron lamination assembly comprising a plurality of laminations stacked along the axial direction, a permanent magnet assembly attached to the inner iron lamination assembly, a front ring assembly attached to a first end of the inner iron lamination assembly, a back ring assembly attached to a second end of the inner iron lamination assembly, a plurality of bosses mounted to the first end and the second end of the inner iron lamination assembly, and a planar spring assembly attached to the plurality of bosses of the inner iron lamination assembly.

18 Claims, 3 Drawing Sheets

MOTOR INNER IRON ASSEMBLY FOR A RECIPROCATING COMPRESSOR

FIELD OF THE INVENTION

The present subject matter relates generally to reciprocating compressors, and more particularly, to motor assemblies for use in reciprocating compressors.

BACKGROUND OF THE INVENTION

Certain refrigerator appliances include sealed systems for cooling chilled chambers of the refrigerator appliance. The sealed systems generally include a compressor that generates compressed refrigerant during operation of the sealed system. The compressed refrigerant flows to an evaporator where heat exchange between the chilled chambers and the refrigerant cools the chilled chambers and food items located therein. Recently, certain refrigerator appliances have included reciprocating compressors, such as linear compressors, for compressing refrigerant. Linear compressors generally include a piston and a driving coil. The driving coil generates a force for sliding the piston forward and backward within a chamber. During motion of the piston within the chamber, the piston compresses refrigerant.

Conventional linear compressors include a motor that is operably coupled to the piston to facilitate movement of the piston and compression of the refrigerant. However, conventional motor assemblies include multiple components, resulting in increased assembly time, maintenance costs, and design complexity. In addition, these assembled motor assemblies are typically very large when assembled and may suffer from poor efficiency.

Accordingly, a reciprocating compressor with an improved motor assembly would be desirable. More specifically, a motor assembly for a reciprocating compressor that has a small footprint while maintaining high levels of efficiency would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a motor assembly for a linear compressor defining an axial direction and a radial direction is provided. The motor assembly includes an inner iron lamination assembly comprising a plurality of laminations stacked along the axial direction, a permanent magnet assembly attached to the inner iron lamination assembly, a front ring assembly attached to a first end of the inner iron lamination assembly, and a back ring assembly attached to a second end of the inner iron lamination assembly.

In another exemplary embodiment, a method of assembling a motor assembly for a linear compressor is provided. The method includes stacking a plurality of laminations stacked along an axial direction to form an inner iron lamination assembly, attaching a front ring assembly to a first end of the inner iron lamination assembly, attaching a back ring assembly to a second end of the inner iron lamination assembly, and attaching a permanent magnet assembly to an outer radial surface of the inner iron lamination assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
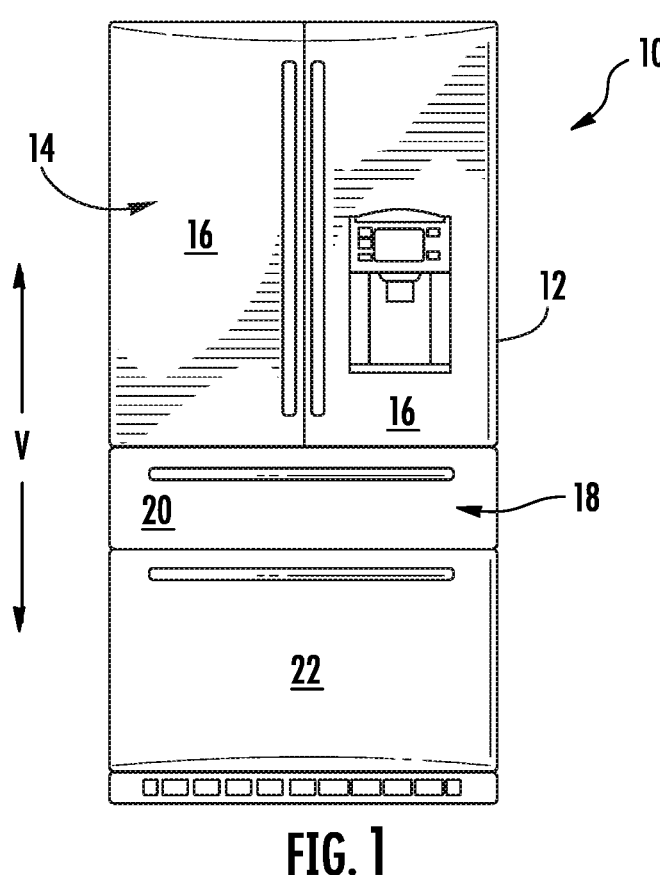
FIG. 1 is a front elevation view of a refrigerator appliance according to an example embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 depicts a refrigerator appliance 10 according to an example embodiment of the present subject matter. According to this example embodiment, the refrigerator appliance 10 is an upright refrigerator having a cabinet or casing 12 that defines a number of internal chilled storage compartments. In particular, refrigerator appliance 10 includes upper fresh-food compartments 14 having doors 16 and lower freezer compartment 18 having upper drawer 20 and lower drawer 22. The drawers 20 and 22 are "pull-out" drawers in that they can be manually moved into and out of the freezer compartment 18 on suitable slide mechanisms.

It should be appreciated that aspects of the present subject matter are equally applicable to other appliance configurations and designs. For example, it should be appreciated that the term "refrigerator appliance" is used in a generic sense herein to encompass any manner of refrigeration appliance, such as a freezer, refrigerator/freezer combination, and any style or model of conventional refrigerator. In addition, it should be understood that the present subject matter is not limited to use in appliances. Thus, the present subject matter may be used for any other suitable purpose, such as vapor compression within air conditioning units or air compression within air compressors.

Figure 2:
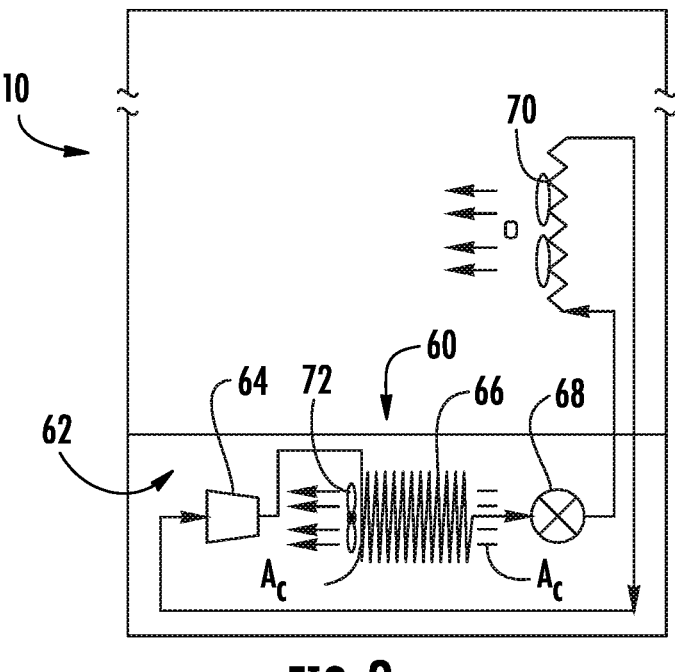
FIG. 2 is schematic view of certain components of the example refrigerator appliance of FIG. 1.

FIG. 2 is a schematic view of certain components of refrigerator appliance 10. As illustrated, refrigerator appliance incorporates a sealed refrigeration system 60. A machinery compartment 62 contains components for executing a known vapor compression cycle for cooling air. The components include a compressor 64, a condenser 66, an expansion device 68, and an evaporator 70 connected in series and charged with a refrigerant. As will be understood by those skilled in the art, refrigeration system 60 may include additional components, e.g., at least one additional evaporator, compressor, expansion device, and/or condenser. As an example, refrigeration system 60 may include two evaporators.

Within refrigeration system 60, refrigerant flows into compressor 64, which operates to increase the pressure of the refrigerant. This compression of the refrigerant raises its temperature, which is lowered by passing the refrigerant through condenser 66. Within condenser 66, heat exchange with ambient air takes place so as to cool the refrigerant. A fan 72 is used to pull air across condenser 66, as illustrated by arrows $A_C$, so as to provide forced convection for a more rapid and efficient heat exchange between the refrigerant within condenser 66 and the ambient air. Thus, as will be understood by those skilled in the art, increasing air flow across condenser 66 can, e.g., increase the efficiency of condenser 66 by improving cooling of the refrigerant contained therein.

An expansion device 68 (e.g., a valve, capillary tube, or other restriction device) receives refrigerant from condenser 66. From expansion device 68, the refrigerant enters evaporator 70. Upon exiting expansion device 68 and entering evaporator 70, the refrigerant drops in pressure. Due to the pressure drop and/or phase change of the refrigerant, evaporator 70 is cool relative to compartments 14 and 18 of refrigerator appliance 10. As such, cooled air is produced and refrigerates compartments 14 and 18 of refrigerator appliance 10. Thus, evaporator 70 is a type of heat exchanger which transfers heat from air passing over evaporator 70 to refrigerant flowing through evaporator 70.

Collectively, the vapor compression cycle components in a refrigeration circuit, associated fans, and associated compartments are sometimes referred to as a sealed refrigeration system operable to force cold air through compartments 14, 18 (FIG. 1). The refrigeration system 60 depicted in FIG. 2 is provided by way of example only. Thus, it is within the scope of the present subject matter for other configurations of the refrigeration system to be used as well. Furthermore, it should be appreciated that terms such as "refrigerant," "gas," "fluid," and the like are generally intended to refer to a motive fluid for facilitating the operation of refrigeration system 60, and may include, fluid, liquid, gas, or any combination thereof in any state.

Figure 3:
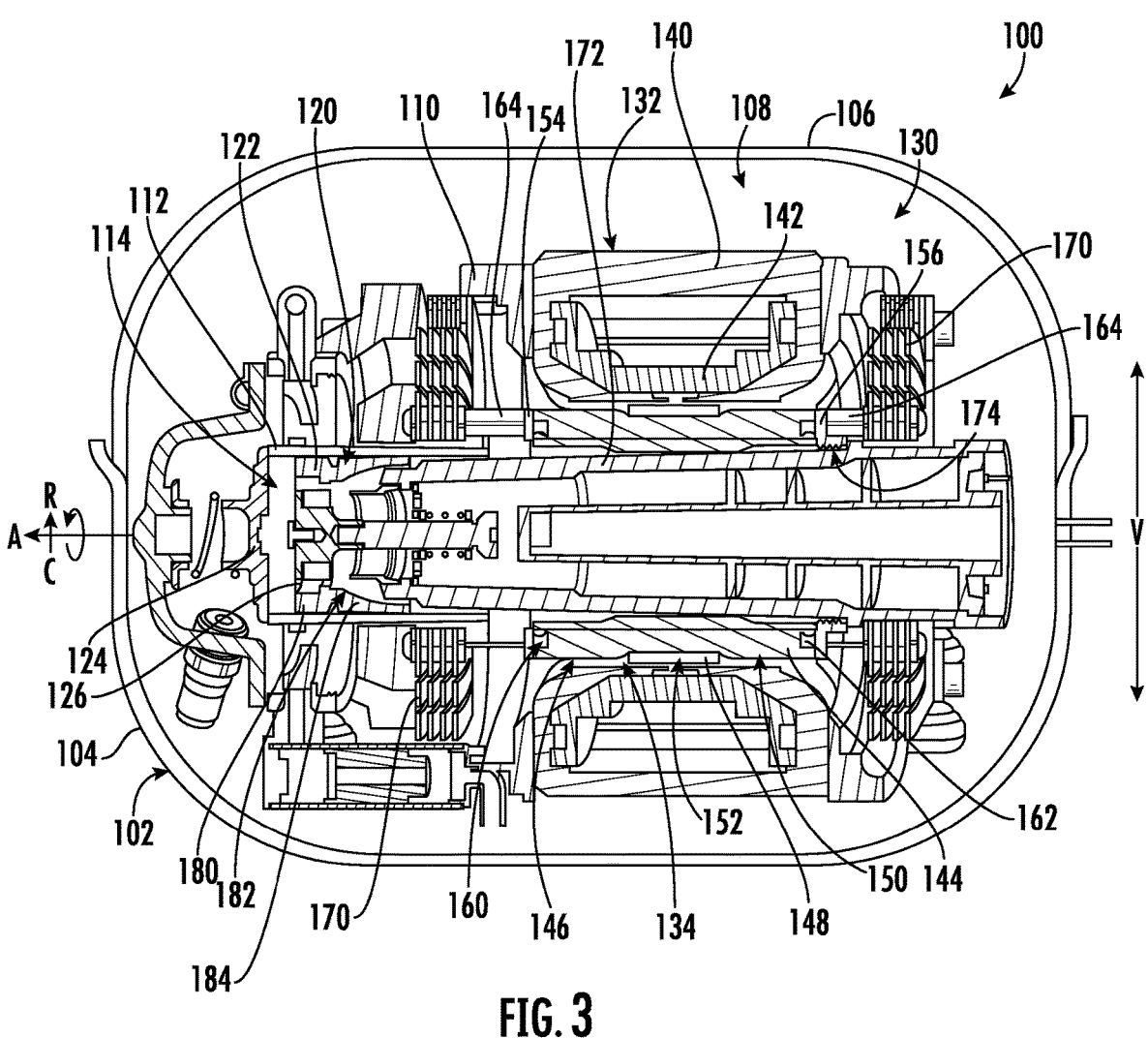
FIG. 3 is a cross-sectional view of a linear compressor according to an example embodiment of the present subject matter.

Referring now generally to FIG. 3, a linear compressor 100 will be described according to an example embodiment of the present subject matter. It should be appreciated that linear compressor 100 is used herein only as an exemplary embodiment to facilitate the description of aspects of the present subject matter. Modifications and variations may be made to linear compressor 100 while remaining within the scope of the present subject matter. Indeed, aspects of the present subject matter are applicable to any suitable piston-actuated or reciprocating compressor.

As illustrated, linear compressor 100 may generally include an outer shell or housing 102. Housing 102 may include a lower portion or lower housing 104 and an upper portion or upper housing 106 which are joined together to form a substantially enclosed cavity 108 for housing various components of linear compressor 100. Specifically, for example, cavity 108 may be a hermetic or air-tight shell that can house working components of linear compressor 100 and may hinder or prevent refrigerant from leaking or escaping from refrigeration system 60. In addition, linear compressor 100 generally defines an axial direction A, a radial direction R, and a circumferential direction C.

Referring still to FIG. 3, various parts and working components of linear compressor 100 will be described according to an exemplary embodiment. As shown, linear compressor 100 includes a casing 110 that extends between a first end and a second end, e.g., along the axial direction A. Casing 110 includes a cylinder 112 that defines a compression chamber 114. Cylinder 112 is positioned at or adjacent the first end of casing 110 and compression chamber 114 extends longitudinally along the axial direction A. As discussed in greater detail below, linear compressor 100 is operable to increase a pressure of fluid within compression chamber 114 of linear compressor 100. Linear compressor 100 may be used to compress any suitable fluid, such as refrigerant or air. In particular, linear compressor 100 may be used in a refrigerator appliance, such as refrigerator appliance 10 (FIG. 1) in which linear compressor 100 may be used as compressor 64 (FIG. 2).

A piston 120 with a piston head 122 is slidably received within compression chamber 114 of cylinder 112. In particular, piston 120 is slidable along the axial direction A. During sliding of piston head 122 within compression chamber 114, piston head 122 compresses refrigerant within compression chamber 114. As an example, from a top dead center position, piston head 122 can slide within compression chamber 114 towards a bottom dead center position along the axial direction A, i.e., an expansion stroke of piston head 122. When piston head 122 reaches the bottom dead center position, piston head 122 changes directions and slides in compression chamber 114 back towards the top dead center position, i.e., a compression stroke of piston head 122. It should be understood that linear compressor 100 may include an additional piston head and/or additional chambers at an opposite end of linear compressor 100. Thus, linear compressor 100 may have multiple piston heads in alternative exemplary embodiments.

Linear compressor 100 also includes one or more valves that permit refrigerant to enter and exit compression chamber 114 during operation of linear compressor 100. For example, a discharge muffler 124 is positioned at an end of compression chamber 114 for regulating the flow of refrigerant out of compression chamber 114, while a suction valve 126 regulates flow of refrigerant into compression chamber 114.

Linear compressor 100 may further include a motor assembly 130 that is operably coupled to piston 120 for facilitating operation of linear compressor 100 and compression of refrigerant. According to an example embodiment, motor assembly 130 includes a stator assembly 132 that is mounted or secured to casing 110. In addition, motor assembly 130 includes a mover assembly 134 that is generally driven by stator assembly 132 for compressing refrigerant. More specifically, mover assembly 134 may be mechanically coupled to piston 120 to facilitate axial translation of piston 120 to compress refrigerant and facilitate operation of linear compressor 100.

For example, stator assembly 132 generally includes an outer back iron or an outer iron lamination assembly 140 and a driving coil 142 that extends about the circumferential direction C within casing 110. In addition, mover assembly 134 may include an inner back iron or inner iron lamination assembly 144 positioned within or surrounded by outer iron lamination assembly 140. In particular, outer iron lamination assembly 140 and/or driving coil 142 may extend about inner iron lamination assembly 144, e.g., along the circumferential direction C and may be used to drive mover assembly 134. As illustrated in FIG. 3, driving coil 142 extends about inner iron lamination assembly 144, e.g., along the circumferential direction C. However, in alternative example embodiments, inner iron lamination assembly 144 may extend around driving coil 142 along the circumferential direction C.

Specifically, inner iron lamination assembly 144 may define an outer radial surface 146 that faces towards outer iron lamination assembly 140 and/or driving coil 142. At least one driving magnet 148 is mounted to inner iron lamination assembly 144, e.g., at the outer radial surface 146 of inner iron lamination assembly 144. According to an example embodiment, driving magnet 148 may be attached to inner iron lamination assembly 144 in any suitable manner, e.g., via epoxy, adhesive, welding, brazing, mechanical fasteners, etc. Driving magnet 148 may face and/or be exposed to driving coil 142. In particular, driving magnet 148 may be spaced apart from driving coil 142, e.g., along the radial direction R by an air gap 150. Thus, air gap 150 may be defined between opposing surfaces of driving magnet 148 and driving coil 142, e.g., along the radial direction R.

Figure 4:
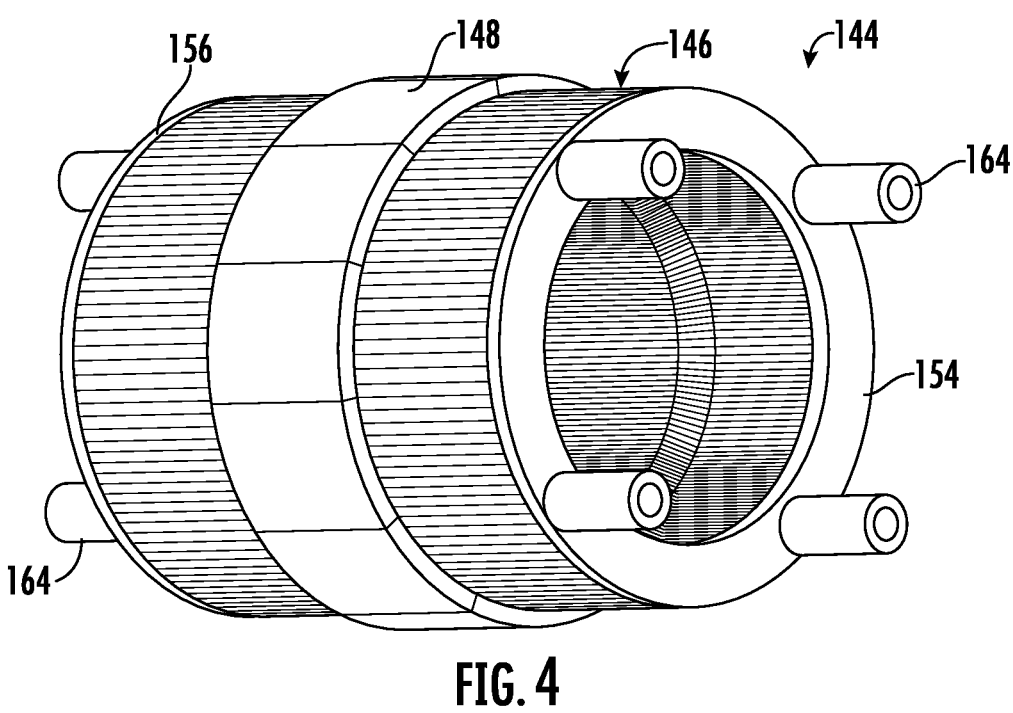
FIG. 4 is a perspective view of a mover assembly and inner iron lamination assembly of the example linear compressor of FIG. 3 according to an example embodiment of the present subject matter.
Figure 5:
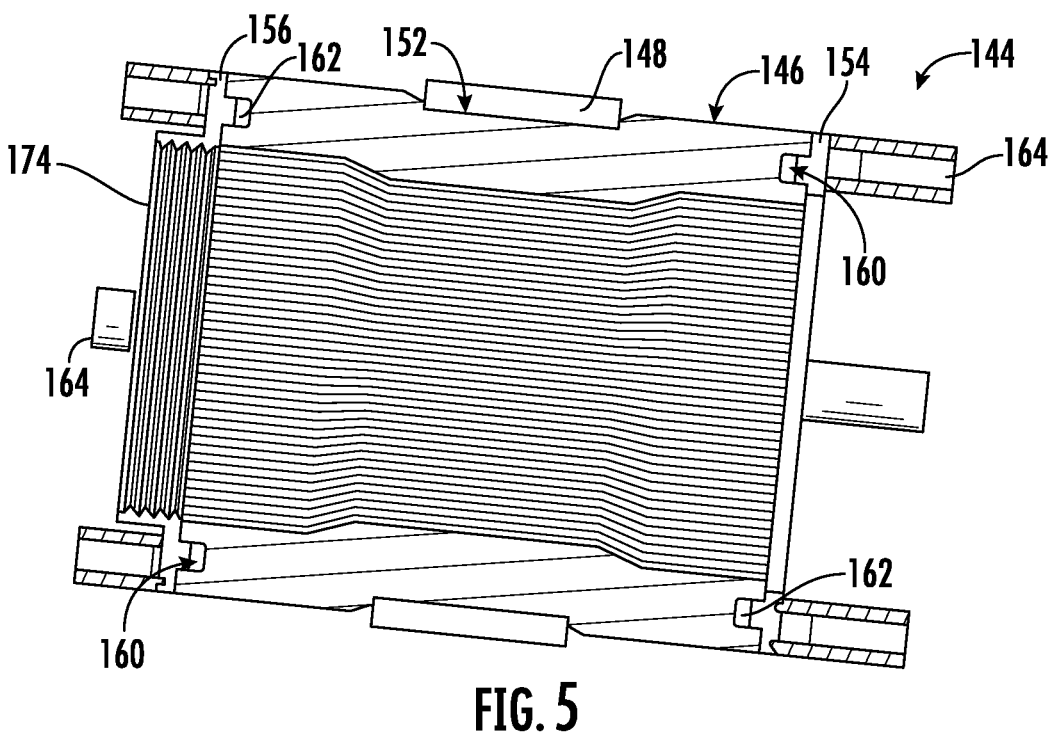
FIG. 5 is a cross-sectional view of the example mover assembly and inner iron lamination assembly of FIG. 4 according to an example embodiment of the present subject matter.

Referring now also to FIGS. 4 and 5, driving magnet 148 may also be mounted or fixed to inner iron lamination assembly 144 such that an outer surface of driving magnet 148 is substantially flush with the outer surface of inner iron lamination assembly 144. In this regard, inner iron lamination assembly 144 may include a plurality of laminations (e.g., ferromagnetic laminations) stacked along the axial direction A. As illustration, the lamination stack may define a radial recess 152 within outer radial surface 146, e.g., a recess that extends inwardly from the outer surface of outer cylinder, e.g., along the radial direction R. Driving magnet 148 may be inset within inner iron lamination assembly 144, e.g., such that it is positioned within radial recess 152, e.g., such that it sits flush with inner iron lamination assembly 144. For example, a maximum diameter of the inner iron lamination assembly is substantially equal to an outer diameter of the driving magnet 148.

Notably, positioning driving magnet 148 within radial recess 152 may create a consistent air gap 150 and the magnetic field from driving coil 142 may have to pass through only a single air gap 150 between outer iron lamination assembly 140 and inner iron lamination assembly 144 during operation of linear compressor 100. In addition, air gap 150 may be relatively constant across the axial direction A, and linear compressor 100 may be more efficient relative to linear compressors with separate air gaps on both sides of a driving magnet.

During operation, driving coil 142 is operable to move the inner iron lamination assembly 144 along the axial direction A. For example, a current may be induced within driving coil 142 by a current source (not shown) to generate a magnetic field that engages driving magnet 148 and urges piston 120 to move along the axial direction A in order to compress refrigerant within compression chamber 114 as described above and will be understood by those skilled in the art. Thus, driving coil 142 may slide piston 120 between the top dead center position and the bottom dead center position, e.g., by moving inner iron lamination assembly 144 along the axial direction A, during operation of driving coil 142.

According to the illustrated example embodiment, the inner iron lamination assembly 144 includes laminations that are distributed along the circumferential direction C in order to form inner iron lamination assembly 144 and are mounted to one another or secured together, e.g., with rings pressed onto ends of the laminations. More specifically, a front ring assembly 154 is attached to a first end of the inner iron lamination assembly 144 and a back ring assembly 156 is attached to a second end of the inner iron lamination assembly 144. According to example embodiments, the front ring assembly 154 and the back ring assembly 156 may be welded or brazed directly to the inner iron lamination assembly 144.

According to the illustrated embodiment, inner iron lamination assembly 144 may further define annular slots 160 at a first and second end that are configured for receiving metal rings 162. Specifically, inner iron lamination assembly 144 defines a front annular slot 160 at the first end and a back annular slot 160 at the second end. A front metal ring 162 and a back metal ring 162 may be press fit or otherwise secured within front annular slot 160 and back annular slot, respectively. In general metal rings 162 may serve to improve the rigidity and performance of inner iron lamination assembly 144.

According to an example embodiment, linear compressor 100 may further include a plurality of bosses 164 mounted to the first end and the second end of the inner iron lamination assembly 144. For example, bosses 164 may be directly mounted to front ring assembly 154 and back ring assembly 156 and may extend along the axial direction A. Bosses 164 may be attached using resistance welding or any other suitable attachment method.

Linear compressor 100 may also include a pair of planar springs 170. Each planar spring 170 may be coupled to a respective end of inner iron lamination assembly 144, e.g., along the axial direction A. For example, planar springs 170 may be attached to inner iron lamination assembly 144, e.g., by bolting or otherwise attaching planar springs 170 directly to bosses 164. Other suitable attachment means are possible and within the scope of the present subject matter.

During operation of driving coil 142, planar springs 170 support inner iron lamination assembly 144 and maintain air gap 150. In particular, inner iron lamination assembly 144 is suspended by planar springs 170 within the stator assembly 132 or motor assembly 130 of linear compressor 100 such that motion of inner iron lamination assembly 144 along the radial direction R is hindered or limited while motion along the axial direction A is relatively unimpeded. Thus, planar springs 170 may be substantially stiffer along the radial direction R than along the axial direction A. In such a manner, planar springs 170 can assist with maintaining a uniformity of the air gap 150 between driving magnet 148 and driving coil 142, e.g., along the radial direction R, during operation of the motor and movement of inner iron lamination assembly 144 on the axial direction A. Planar springs 170 can also assist with hindering side pull forces of the motor from transmitting to piston 120 and being reacted in cylinder 112 as a friction loss.

Linear compressor 100 may further include a flex mount 172 that is mechanically coupled piston 120 to inner iron lamination assembly 144. For example, flex mount 172 is mounted to and extends through inner iron lamination assembly 144. In particular, flex mount 172 is mounted to inner iron lamination assembly 144. Thus, flex mount 172 may be coupled to back ring assembly 156 (e.g., via a threaded connection 174), thereby fixing flex mount 172 to inner iron lamination assembly 144. Flex mount 172 may assist with forming a coupling that inner iron lamination assembly 144 and piston 120 such that motion of inner iron lamination assembly 144, e.g., along the axial direction A, is transferred to piston 120. This coupling may be a compliant coupling that is compliant or flexible along the radial direction R. In particular, the coupling may be sufficiently compliant along the radial direction R such that little or no motion of inner iron lamination assembly 144 along the radial direction R is transferred to piston 120. In such a manner, side pull forces of the motor are decoupled from piston 120 and/or cylinder 112 and friction between piston 120 and cylinder 112 may be reduced.

As may be seen in the figures, piston head 122 of piston 120 has a piston cylindrical side wall 180. Cylindrical side wall 180 may extend along the axial direction A from piston head 122 towards inner iron lamination assembly 144. An outer surface of cylindrical side wall 180 may slide on cylinder 112 at compression chamber 114 and an inner surface of cylindrical side wall 180 may be positioned opposite the outer surface of cylindrical side wall 180. Thus, the outer surface of cylindrical side wall 180 may face away from a center of cylindrical side wall 180 along the radial direction R, and the inner surface of cylindrical side wall 180 may face towards the center of cylindrical side wall 180 along the radial direction R.

Flex mount 172 extends between a first end portion and a second end portion, e.g., along the axial direction A. According to an exemplary embodiment, the inner surface of cylindrical side wall 180 defines a ball seat 182 proximate first end portion. In addition, the coupling of flex mount 172 also includes a ball nose 184. Specifically, for example, ball nose 184 is positioned at first end portion of flex mount 172, and ball nose 184 may contact flex mount 172 at first end portion of flex mount 172. In addition, ball nose 184 may contact piston 120 at ball seat 182 of piston 120. In particular, ball nose 184 may rest on ball seat 182 of piston 120 such that ball nose 184 is slidable and/or rotatable on ball seat 182 of piston 120. For example, ball nose 184 may have a frusto-spherical surface positioned against ball seat 182 of piston 120, and ball seat 182 may be shaped complementary to the frusto-spherical surface of ball nose 184. The frusto-spherical surface of ball nose 184 may slide and/or rotate on ball seat 182 of piston 120.

Relative motion between flex mount 172 and piston 120 at the interface between ball nose 184 and ball seat 182 of piston 120 may provide reduced friction between piston 120 and cylinder 112, e.g., compared to a fixed connection between flex mount 172 and piston 120. For example, when an axis on which piston 120 slides within cylinder 112 is angled relative to the axis on which inner iron lamination assembly 144 reciprocates, the frusto-spherical surface of ball nose 184 may slide on ball seat 182 of piston 120 to reduce friction between piston 120 and cylinder 112 relative to a rigid connection between inner iron lamination assembly 144 and piston 120.

Linear compressor 100 may include various components for permitting and/or regulating operation of linear compressor 100. In particular, linear compressor 100 includes a controller (not shown) that is configured for regulating operation of linear compressor 100. The controller is in, e.g., operative, communication with the motor, e.g., driving coil 142 of the motor. Thus, the controller may selectively activate driving coil 142, e.g., by inducing current in driving coil 142, in order to compress refrigerant with piston 120 as described above. Accordingly, the controller may be a processing device that is generally configured to facilitate operation of linear compressor 100 and/or refrigerator appliance 10.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 166 may be constructed without using a microprocessor, e.g., using a combination of discrete analog and/or digital logic circuitry (such as switches, amplifiers, integrators, comparators, flipflops, AND/OR gates, and the like) to perform control functionality instead of relying upon software.

The controller may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

As described herein, aspects of the present subject matter are generally directed to a linear compressor that includes an inner iron assembly/lamination designed to reduce the size of the motor and the overall compressor. The motor inner iron lamination may form a rigid structure by welding end rings directly to the assembly to eliminate the need for an inner sleeve part. A piston flex mount may be attached to the inner iron assembly by adding threads into the back end ring part. The fixturing of the springs may use weld nuts on the front and back end rings to hold the inner iron assembly and maintain the air gap between the magnets and the outer iron. This inner iron lamination arrangement reduces the number of parts as well as overall diameter of the inner iron of the motor. This also leads to reducing the diameter for the winding and outer iron array, thus reducing the overall size and cost of the motor and the compressor.

The written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A motor assembly for a linear compressor defining an axial direction and a radial direction, the motor assembly comprising:

an inner iron lamination assembly comprising a plurality of laminations stacked along the axial direction;

a permanent magnet assembly attached to the inner iron lamination assembly;

a front ring assembly attached to a first end of the inner iron lamination assembly;

a back ring assembly attached to a second end of the inner iron lamination assembly;

a plurality of bosses mounted to the first end and the second end of the inner iron lamination assembly; and a planar spring assembly attached to the plurality of bosses of the inner iron lamination assembly.

2. The motor assembly of claim 1, wherein the permanent magnet assembly is epoxied to an outer radial surface of the inner iron lamination assembly.

3. The motor assembly of claim 1, wherein an outer radial surface of the inner iron lamination assembly defines a radial recess and the permanent magnet assembly is seated within the radial recess.

4. The motor assembly of claim 3, wherein a maximum diameter of the inner iron lamination assembly is substantially equal to an outer diameter of the permanent magnet assembly.

5. The motor assembly of claim 1, wherein the inner iron lamination assembly defines a front annular slot at the first end and a back annular slot at the second end, the motor assembly further comprising:

a front metal ring that is press fit into the front annular slot; and a back metal ring that is press fit into the back annular slot.

6. The motor assembly of claim 1, wherein the front ring assembly and the back ring assembly are welded or brazed directly to the inner iron lamination assembly.

7. The motor assembly of claim 1, wherein the planar spring assembly is bolted to the bosses.

8. The motor assembly of claim 1, further comprising:

an outer iron lamination assembly positioned outside the inner iron lamination assembly along the radial direction.

9. The motor assembly of claim 8, wherein the planar spring assembly maintains an airgap between the inner iron lamination assembly and the outer iron lamination assembly.

10. The motor assembly of claim 1, wherein the bosses are mounted to the front ring assembly and the back ring assembly.

11. The motor assembly of claim 10, wherein the bosses are resistance welded to the front ring assembly and the back ring assembly.

12. The motor assembly of claim 1, wherein the back ring assembly defines internal threads, the motor assembly further comprising:

a piston flex mount attached to the back ring assembly using the internal threads.

13. A method of assembling a motor assembly for a linear compressor, the method comprising:

stacking a plurality of laminations stacked along an axial direction to form an inner iron lamination assembly;

attaching a front ring assembly to a first end of the inner iron lamination assembly;

attaching a back ring assembly to a second end of the inner iron lamination assembly;

attaching a permanent magnet assembly to an outer radial surface of the inner iron lamination assembly;

mounting a plurality of bosses to the first end and the second end of the inner iron lamination assembly; and attaching a planar spring assembly to the plurality of bosses of the inner iron lamination assembly.

14. The method of claim 13, wherein the front ring assembly and the back ring assembly are welded or brazed directly to the inner iron lamination assembly.

15. The method of claim 13, wherein the outer radial surface of the inner iron lamination assembly defines a radial recess and the permanent magnet assembly is seated within the radial recess.

16. The method of claim 13, further comprising:

positioning an outer iron lamination assembly outside the inner iron lamination assembly along a radial direction, wherein the planar spring assembly maintains an airgap between the inner iron lamination assembly and the outer iron lamination assembly.

17. The method of claim 13, wherein the inner iron lamination assembly defines a front annular slot at the first end and a back annular slot at the second end, the method further comprising:

press fitting a front metal ring into the front annular slot; and press fitting a back metal ring into the back annular slot.

18. The method of claim 13, wherein the back ring assembly defines internal threads, the method further comprising:

attaching a piston flex mount to the back ring assembly using the internal threads.

\* \* \* \* \*